United States Patent
Yamaguchi et al.

(10) Patent No.: US 10,566,644 B2
(45) Date of Patent: Feb. 18, 2020

(54) BATTERY CELL AND REDOX FLOW BATTERY

(71) Applicant: Sumitomo Electric Industries, Ltd., Osaka (JP)

(72) Inventors: Hideyuki Yamaguchi, Osaka (JP); Katsuya Yamanishi, Osaka (JP); Takashi Kanno, Osaka (JP); Takefumi Ito, Osaka (JP); Masahiro Kuwabara, Osaka (JP); Kiyoaki Moriuchi, Osaka (JP); Kiyoaki Hayashi, Osaka (JP); Hayato Fujita, Osaka (JP); Kousuke Shiraki, Osaka (JP)

(73) Assignee: Sumitomo Electric Industries, Ltd., Osaki-shi (JP)

( * ) Notice: Subject to any disclaimer, the term of this patent is extended or adjusted under 35 U.S.C. 154(b) by 251 days.

(21) Appl. No.: 15/524,927

(22) PCT Filed: Oct. 5, 2015

(86) PCT No.: PCT/JP2015/078208
§ 371 (c)(1),
(2) Date: May 5, 2017

(87) PCT Pub. No.: WO2016/072191
PCT Pub. Date: May 12, 2016

(65) Prior Publication Data
US 2017/0324108 A1    Nov. 9, 2017

(30) Foreign Application Priority Data
Nov. 6, 2014 (JP) ................. 2014-226268

(51) Int. Cl.
*H01M 8/0273*  (2016.01)
*H01M 8/18*    (2006.01)
(Continued)

(52) U.S. Cl.
CPC ............ *H01M 8/188* (2013.01); *H01M 8/02* (2013.01); *H01M 8/0271* (2013.01);
(Continued)

(58) Field of Classification Search
None
See application file for complete search history.

(56) References Cited

U.S. PATENT DOCUMENTS

| | | | | |
|---|---|---|---|---|
| 4,588,660 A | * | 5/1986 | Shimizu | H01M 8/242 429/509 |
| 2002/0110719 A1 | * | 8/2002 | Pien | C25B 9/18 429/423 |
| 2012/0156535 A1 | | 6/2012 | Harrer et al. | |

FOREIGN PATENT DOCUMENTS

| | | |
|---|---|---|
| CN | 102569862 A | 7/2012 |
| JP | 2006324129 A * | 11/2006 |
| JP | 2014-139905 A | 7/2014 |

OTHER PUBLICATIONS

JP-2006324129-A—Machine translation (Year: 2006).*

* cited by examiner

*Primary Examiner* — Haroon S. Sheikh
(74) *Attorney, Agent, or Firm* — Baker Botts L.L.P.; Michael A. Sartori

(57) ABSTRACT

Provided are a battery cell that can be produced efficiently. A frame body of each cell frame of a battery cell includes an inner peripheral recessed portion formed by reducing a thickness of a peripheral portion that surrounds an entire perimeter of the penetrating window so that the peripheral portion has a smaller thickness than other portions of the frame body. A bipolar plate of the battery cell includes an outer peripheral engaging portion that engages with the inner peripheral recessed portion, the outer peripheral engaging portion being a portion having a particular width (Continued)

and extending throughout an entire outer periphery of the bipolar plate. The battery cell includes a disrupting structure that disrupts a leak channel that serves as an escape route for the electrolyte, the leak channel causing the inlet slit and the outlet slit to be in communication with each other and being formed between an outer periphery of the inner peripheral recessed portion and an outer periphery of the outer peripheral engaging portion when the cell frames are viewed from front.

7 Claims, 12 Drawing Sheets

(51) Int. Cl.
    *H01M 8/0271*    (2016.01)
    *H01M 8/02*    (2016.01)
    *H01M 8/0297*    (2016.01)

(52) U.S. Cl.
    CPC ....... *H01M 8/0273* (2013.01); *H01M 8/0297* (2013.01); *H01M 8/18* (2013.01); *H01M 2250/10* (2013.01); *H01M 2300/0017* (2013.01); *Y02B 90/14* (2013.01); *Y02E 60/528* (2013.01)

BATTERY CELL AND REDOX FLOW BATTERY

TECHNICAL FIELD

The present invention relates to a battery cell used in an electrolyte-circulating battery and a redox flow battery that uses the battery cell.

BACKGROUND ART

One category of high-capacity storage batteries that store new energy such as solar power and wind power is electrolyte-circulating batteries whose representative example is redox flow batteries (RF batteries). RF batteries are a type of batteries that are charged and discharged by utilizing the difference in redox potential between the ions contained in the positive electrode electrolyte and ions contained in the negative electrode electrolyte (for example, refer to PTL 1). As illustrated in an operation principle diagram of an RF battery 1 in FIG. 15, the RF battery 1 includes a battery cell 100 that includes a positive electrode cell 102 and a negative electrode cell 103 separated from each other by a hydrogen-ion-permeable membrane 101. The positive electrode cell 102 includes a positive electrode 104 built therein and a positive electrode electrolyte tank 106 that stores the positive electrode electrolyte is connected to the positive electrode cell 102 via ducts 108 and 110. A pump 112 is connected to the duct 108. These components denoted by 106, 108, 110, and 112 constitute a positive electrode circulation mechanism 100P configured to circulate the positive electrode electrolyte. Similarly, the negative electrode cell 103 includes a negative electrode 105 built therein and a negative electrode electrolyte tank 107 that stores the negative electrode electrolyte is connected to the negative electrode cell 103 via ducts 109 and 111. A pump 113 is connected to the duct 109. These components denoted by 107, 109, 111, and 113 constitute a negative electrode circulation mechanism 100N configured to circulate the negative electrode electrolyte. The electrolytes stored in the tanks 106 and 107 are circulated into the cells 102 and 103 by the pumps 112 and 113 during charge and discharge. When neither charge nor discharge is being conducted, the pumps 112 and 113 stop operation and the electrolytes are not circulated.

In general, the battery cell 100 is formed inside a structure called a battery cell stack 200 such as one shown in FIG. 16. The battery cell stack 200 is prepared by sandwiching a stack structure called a substack 200s between two end plates 210 and 220 on the both sides and clamping them together by a clamping mechanism 230 (the structure illustrated in the drawing uses plural substacks 200s). As shown in the upper part of FIG. 16, the substack 200s is prepared by stacking cell units each including a cell frame 120, a positive electrode 104, a membrane 101, a negative electrode 105, and another cell frame 120 and sandwiching the stacked cell units between supply/discharge plates 190 and 190 (refer to the lower part of FIG. 16). Each of the cell frames 120 in the cell unit has a frame body 122 that has a penetrating window and a bipolar plate 121 that fills the penetrating window. The positive electrode 104 is arranged to contact a first surface side of the bipolar plate 121 and the negative electrode 105 is arranged to contact a second surface side of the bipolar plate 121. According to this configuration, one battery cell 100 is formed between the bipolar plates 121 of the adjacent cell frames 120.

Distribution of the electrolytes to the battery cell 100 via the supply/discharge plates 190 and 190 of the substack 200s is performed through liquid supplying manifolds 123 and 124 and liquid discharging manifolds 125 and 126 formed in the frame bodies 122. The positive electrode electrolyte is supplied to the positive electrode 104 from the liquid supplying manifold 123 via an inlet slit formed in the first surface side (the front side of the plane of the paper of the drawing) of the frame body 122 and discharged to the liquid discharging manifold 125 via an outlet slit formed in an upper portion of the frame body 122. Similarly, the negative electrode electrolyte is supplied to the negative electrode 105 from the liquid supplying manifold 124 via an inlet slit (shown by dotted lines) formed in the second surface side (the rear side of the plane of the paper of the drawing) of the frame body 122 and is discharged to the liquid discharging manifold 126 via an outlet slit (shown by dotted lines) formed in an upper portion of the frame body 122. A ring-shaped seal member 127 such as an O-ring or a flat packing is placed between the cell frames 120 to suppress leakage of the electrolytes from the substack 200s.

Input and output of power between an external device and the battery cell 100 in the substack 200s are achieved by a current-collecting structure that uses current collector plates formed of a conductive material. One pair of current collector plates is provided for each substack 200s, and the current collector plates are respectively electrically connected to the bipolar plates 121 of two cell frames 120 located at two ends in the stacking direction among the stacked cell frames 120.

CITATION LIST

Patent Literature

PTL 1: Japanese Unexamined Patent Application Publication No. 2014-139905

SUMMARY OF INVENTION

Technical Problem

Recently, demand for redox flow batteries as means for storing new energy has been expected to grow and battery cells that can be efficiently produced are in demand. For example, cell frames of battery cells are usually prepared by sandwiching a bipolar plate between two frame-shaped plate members and bonding the frame-shaped plate members with an adhesive or the like. In such a case, two frame-shaped plate members serve as frame bodies of a cell frame. According to this configuration, not only alignment of two frame-shaped plate members is cumbersome, but also the work needed to retain the two frame-shaped plate members until the adhesive is dry is cumbersome. Thus, efficiency of producing cell frames is rarely high. If the efficiency of producing cell frames is low, the efficiency of producing battery cells that include cell frames is also naturally low.

The present invention has been made under the above-described circumstances and one of the objects thereof is to provide a battery cell that can be produced efficiently. Another object of the present invention is to provide a redox flow battery that uses the battery cell.

Solution to Problem

A battery cell according to an embodiment of the present invention includes a cell unit in which a membrane is sandwiched between a positive electrode and a negative electrode and the electrodes are sandwiched between a pair of cell frames. The cell frames each include a frame body that has a penetrating window and a bipolar plate that contacts the electrode by filling the penetrating window. The frame body includes a liquid supplying manifold that penetrates through the frame body in a thickness direction thereof to serve as a supply channel of an electrolyte, a liquid discharging manifold that serves as a discharge channel of the electrolyte, an inlet slit through which the electrolyte is introduced from the liquid supplying manifold to the electrode, and an outlet slit through which the electrolyte is discharged from the electrode to the liquid discharging manifold. The frame body of this battery cell includes an inner peripheral recessed portion formed by reducing a thickness of a peripheral portion that surrounds an entire perimeter of the penetrating window so that the peripheral portion has a thickness smaller than other portions of the frame body. The bipolar plate includes an outer peripheral engaging portion that engages with the inner peripheral recessed portion, the outer peripheral engaging portion being a portion having a particular width and extending throughout an entire outer periphery of the bipolar plate. The battery cell includes a disrupting structure that disrupts a leak channel that serves as an escape route for the electrolyte, the leak channel causing the inlet slit and the outlet slit to be in communication with each other and being formed between an outer periphery of the inner peripheral recessed portion and an outer periphery of the outer peripheral engaging portion when the cell frames are viewed from front.

A redox flow battery according to an embodiment of the present invention includes a cell stack obtained by stacking a plurality of the battery cells described above, a positive electrode circulation mechanism that causes a positive electrode electrolyte to circulate through the cell stack, and a negative electrode circulation mechanism that causes a negative electrode electrolyte to circulate through the cell stack.

Advantageous Effects of Invention

Since the battery cell and the redox flow battery described above include a cell frame formed by inserting a bipolar plate to an inner peripheral recessed portion of a frame body, production efficiency is excellent.

DESCRIPTION OF EMBODIMENTS

Figure 1:
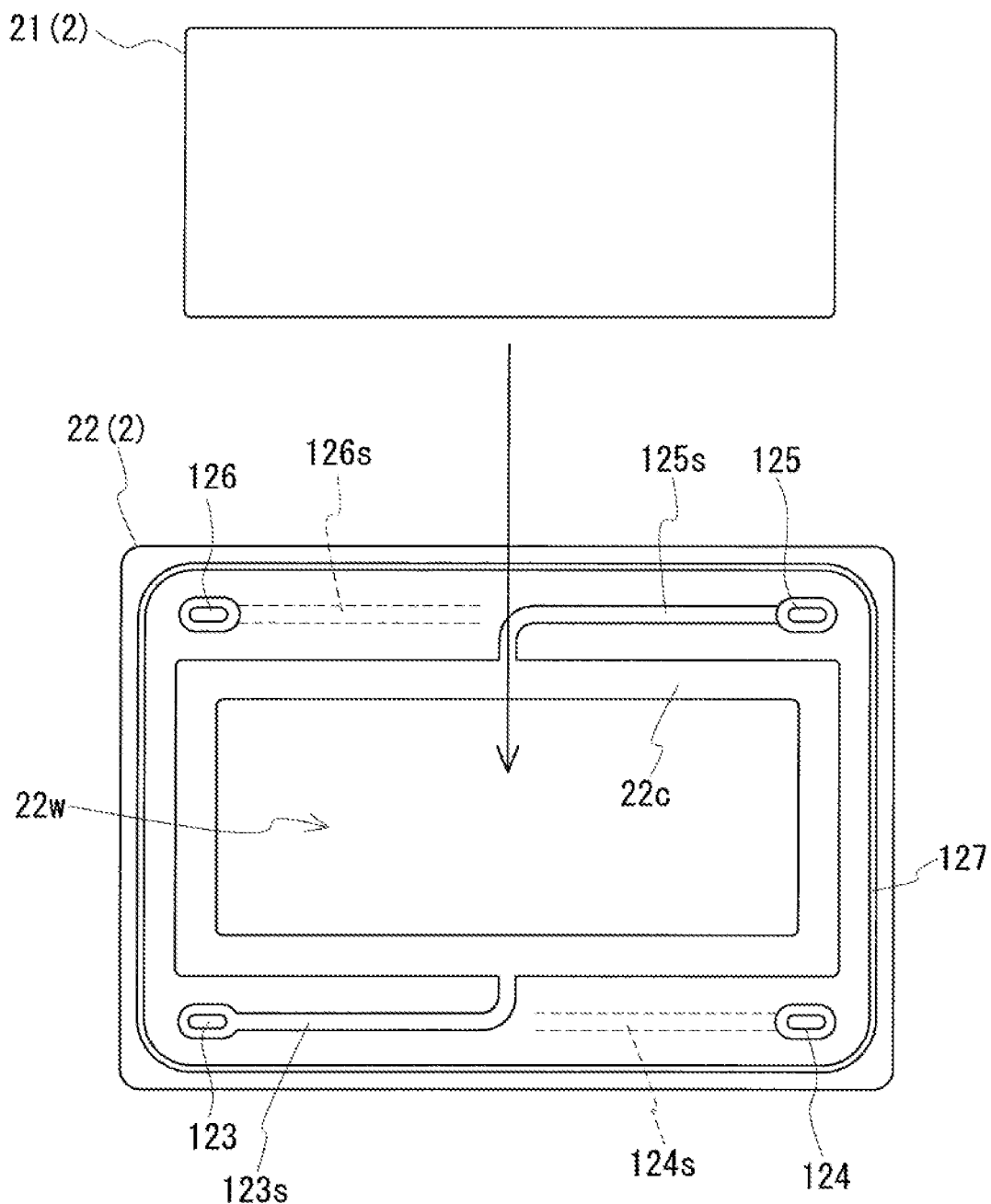
FIG. 1 is a schematic diagram illustrating a frame body and a bipolar plate of a cell frame included in a battery cell according to Embodiment 1.

Description of Embodiments of the Present Invention

First, features of the embodiments of the present invention are listed.

The inventors of the present invention pursuing battery cells that can be produced efficiently have focused on cell frames of battery cells and studied an insertion-type cell frame in which a bipolar plate is inserted to a frame body. In the study, the inventors have focused on the presence of a leak channel, which serves as a flow channel of the electrolyte from the inlet slit to the outlet slit and is formed between the frame body and the bipolar plate when the insertion-type cell frame is viewed in plan. Since the frame body and the bipolar plate are both rigid components, a gap tends to occur between the frame body and the bipolar plate due to the difference in tolerance and thermal expansion between the frame body and the bipolar plate, and this gap serves as a leak channel. The leak channel is the gap between components and because no electrode is present, the channel resistance is significantly small and the electrolyte introduced to the bipolar plate from the inlet slit easily flows into the leak channel. The electrolyte flowing in the leak channel is discharged to the outlet slit substantially without contacting the electrode on the bipolar plate; thus, as more electrolyte flows into the leak channel, the charge/discharge efficiency of the battery cell is decreased. To address these issues, the inventors have accomplished a battery cell having the following features.

<1> A battery cell according to an embodiment includes a cell unit in which a membrane is sandwiched between a positive electrode and a negative electrode and the electrodes are sandwiched between a pair of cell frames. The cell frames each include a frame body that has a penetrating window and a bipolar plate that contacts the electrode by filling the penetrating window. The frame body includes a liquid supplying manifold that penetrates through the frame body in a thickness direction thereof to serve as a supply channel of an electrolyte, a liquid discharging manifold that serves as a discharge channel of the electrolyte, an inlet slit through which the electrolyte is introduced from the liquid supplying manifold to the electrode, and an outlet slit through which the electrolyte is discharged from the electrode to the liquid discharging manifold. The frame body of this battery cell includes an inner peripheral recessed portion formed by reducing a thickness of a peripheral portion that surrounds an entire perimeter of the penetrating window so that the peripheral portion has a smaller thickness than other portions of the frame body. The bipolar plate includes an outer peripheral engaging portion that engages with the inner peripheral recessed portion, the outer peripheral engaging portion being a portion having a particular width and extending throughout an entire outer periphery of the bipolar plate. The battery cell includes a disrupting structure that disrupts a leak channel that serves as an escape route for the electrolyte, the leak channel causing the inlet slit and the outlet slit to be in communication with each other and being formed between an outer periphery of the inner peripheral recessed portion and an outer periphery of the outer peripheral engaging portion when the cell frames are viewed from front.

According to the cell frame included in the battery cell described above, the bipolar plate can be placed in the penetrating window of the frame body and the position of the bipolar plate with respect to the frame body can be set by merely inserting the bipolar plate to a position of the inner peripheral recessed portion of the frame body. Thus, the production efficiency is excellent. The efficiency of producing battery cells can also be improved by using the cell frame that can be efficiently produced.

According to the cell frame included in the battery cell described above, a leak channel of the electrolyte that extends from the inlet slit to the outlet slit and is formed between the frame body and the bipolar plate when the cell frame is viewed in plan is disrupted. Thus, the amount of the electrolyte flowing in the leak channel can be significantly reduced. As a result, degradation of the charge/discharge efficiency of the battery cell attributable to the leak channel can be suppressed.

<2> According to an example configuration of the battery cell according to the embodiment, the outer peripheral engaging portion is formed to have a smaller thickness than other portions of the bipolar plate.

Since the outer peripheral engaging portion of the bipolar plate that engages with the inner peripheral recessed portion of the frame body is thinner than other portions of the bipolar plate, the state in which the bipolar plate is inserted to the frame body is stabilized.

<3> According to an example configuration of the battery cell according to the embodiment, there is included a disrupting member that is inserted to the leak channel to disrupt the leak channel.

The leak channel can be easily and assuredly disrupted by using the disrupting member. The position at which the disrupting member is inserted to the leak channel is not particularly limited. Preferably, the disrupting member is inserted to a position of the leak channel close to the inlet slit.

<4> According to an example configuration of the battery cell according to the embodiment, when the cell frames are viewed in plan, a portion of an outer rim portion of the bipolar plate protrudes toward the frame body and this protruding portion disrupts the leak channel.

It is extremely difficult to make the dimensions of the bipolar plate the same as the dimensions of the portion of the frame body where the bipolar plate is inserted to avoid formation of the leak channel. Even if these dimensions are made the same, then it becomes difficult to insert the bipolar plate to the frame body. However, in the configuration described in <4> above, only a portion of the bipolar plate is made to protrude toward the frame body when the cell frame is viewed in plan; thus, while the difficulty of inserting the bipolar plate to the frame body is avoided, the leak channel can be disrupted by the protruding portion of the bipolar plate. Moreover, according to the structure in which a leak channel is disrupted by using a portion of the bipolar plate, there is an advantage the leak channel can be disrupted without preparing a separate disrupting member.

<5> According to an example configuration of the battery cell according to the embodiment, when the cell frames are viewed in plan, a portion of the frame body protrudes toward the bipolar plate and this protruding portion disrupts the leak channel.

Since only a portion of the frame body protrudes toward the bipolar plate when the cell frame is viewed in plan, the leak channel can be disrupted by the protruding portion of the bipolar plate while avoiding the difficulty of inserting the bipolar plate to the frame body. Moreover, according to the structure in which a leak channel is disrupted by using a portion of the frame body, there is an advantage that the leak channel can be disrupted without preparing a separate component.

The features described in <3> to <5> can be used in combination.

<6> A redox flow battery according to an embodiment includes a cell stack obtained by stacking a plurality of the battery cells described above, a positive electrode circulation mechanism that causes a positive electrode electrolyte to circulate through the cell stack, and a negative electrode circulation mechanism that causes a negative electrode electrolyte to circulate through the cell stack.

The redox flow battery described above can be produced efficiently. This is because the efficiency of producing the battery cells included in the redox flow battery is higher than in related art.

Detailed Description of the Embodiments of the Present Invention

Embodiments of a redox flow battery (hereinafter referred to as an RF battery) according to an embodiment will now be described. It is to be understood that the present invention is not limited to the structures of the embodiments described below but is intended to include all modifications and alterations defined by the claims and within the meaning and the scope of the equivalents of the claims.

Embodiment 1

Figure 15:
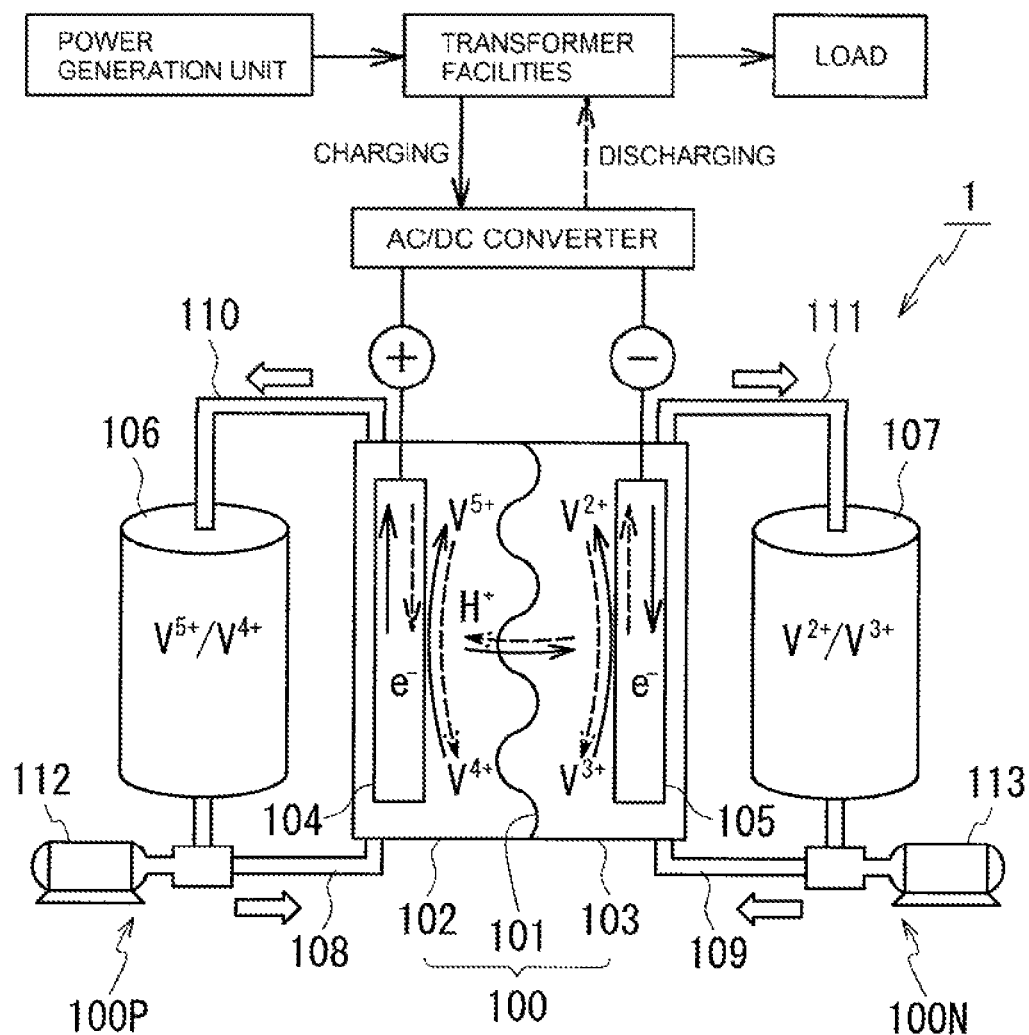
FIG. 15 is a diagram illustrating operation principle of a redox flow battery.
Figure 16:
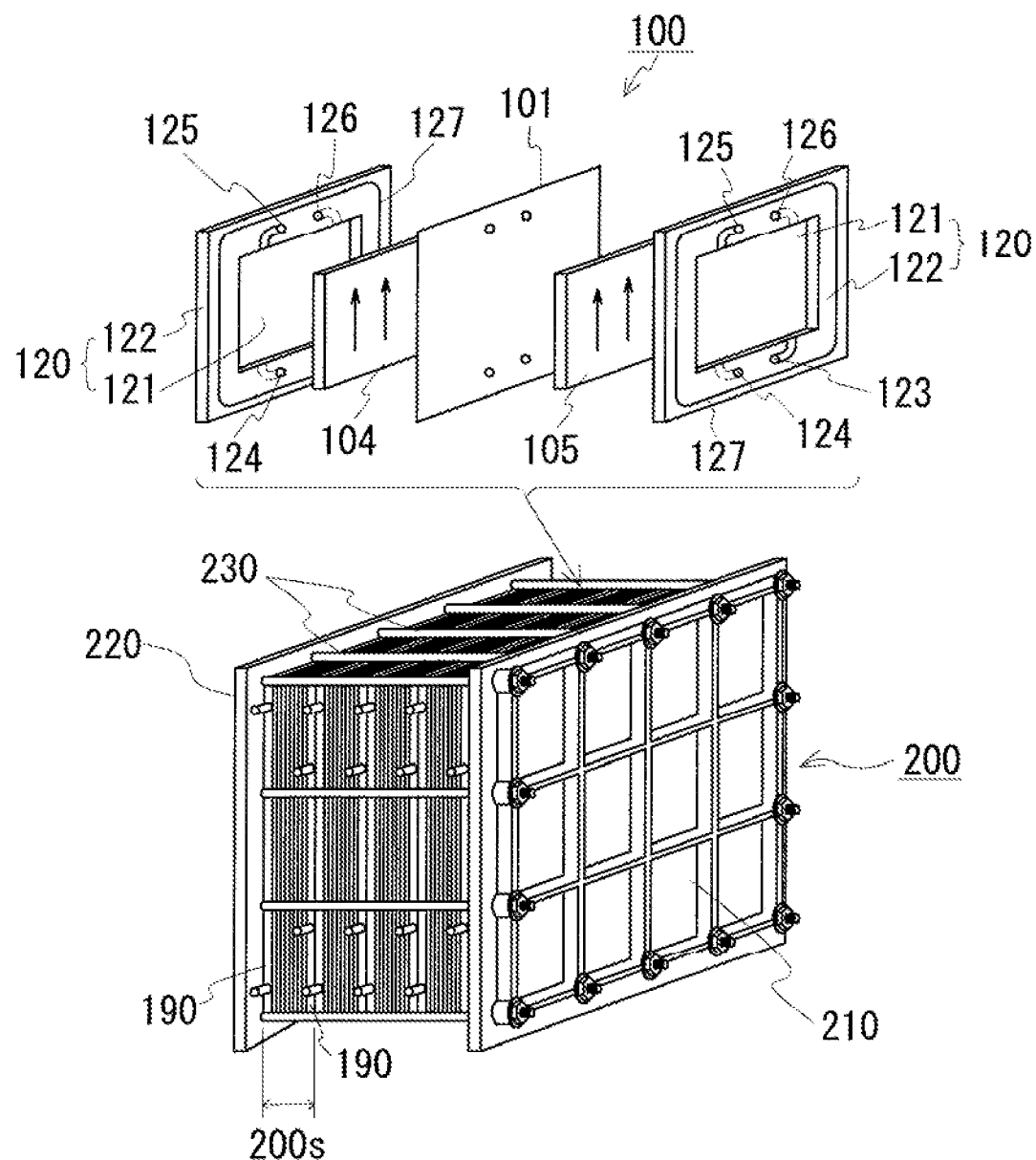
FIG. 16 is a schematic diagram illustrating a cell stack for batteries.

As with the RF battery 1 of related art illustrated in FIG. 15, an RF battery according to this embodiment includes a battery cell 100, a positive electrode circulation mechanism 100P, and a negative electrode circulation mechanism 100N. The battery cell 100 according to this embodiment is used in the form of a battery cell stack 200 illustrated in FIG. 16. As mentioned above, the battery cell stack 200 has a structure in which plural cell units each equipped with a membrane 101, electrodes 104 and 105, and a pair of cell frames 120 and 120 are stacked. The main difference between the RF battery of this embodiment and that of the related art is the structure of the cell frame. Below, the structure of a cell frame 2 according to this embodiment is mainly described with reference to FIGS. 1 to 11. The features of the cell frame 2 identical to those of the related art are denoted by the same reference symbols as those in FIG. 16 and the descriptions therefor are omitted.

<<Cell Frame>>

Figure 2:
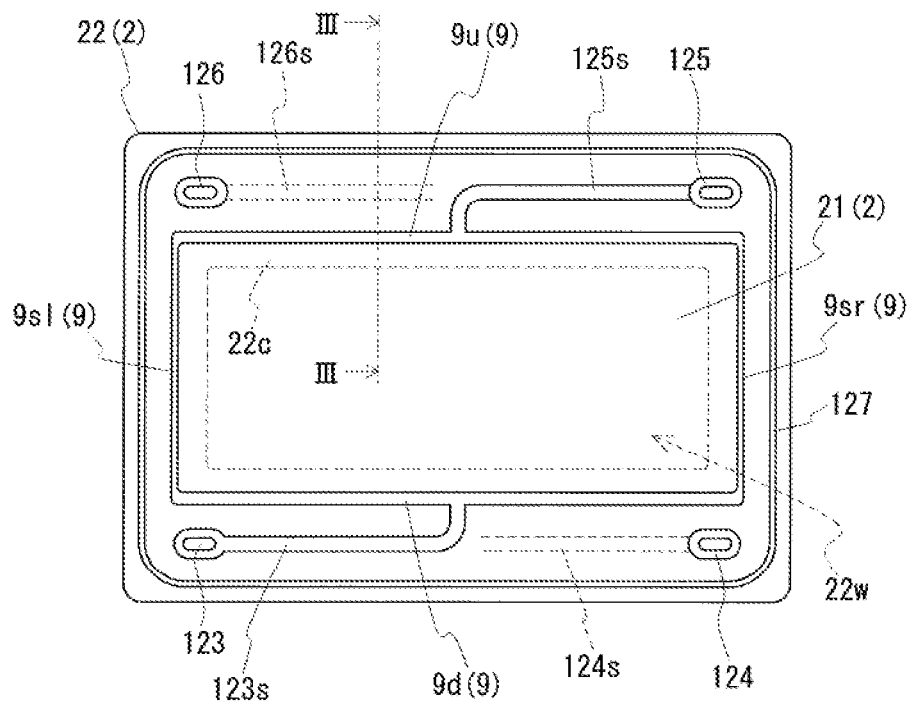
FIG. 2 is a schematic diagram illustrating a cell frame in which the frame body and the bipolar plate illustrated in FIG. 1 are combined.

As illustrated in FIG. 1, the cell frame 2 includes a frame body 22 and a bipolar plate 21. The frame body 22 has a penetrating window 22w that penetrates through the frame body 22 in the thickness direction and, as indicated by the thick arrow, the bipolar plate 21 is placed to fill the penetrating window 22w (the state in which the bipolar plate 21 is placed in the penetrating window 22w of the frame body 22 is illustrated in FIG. 2). The difference between this cell frame 2 and that of the related art is that the cell frame 2 employs a structure in which the outer periphery of the bipolar plate 21 engages with a peripheral portion of the frame body 22 that surrounds the penetrating window 22w, in other words, an insertion structure in which the bipolar plate 21 is inserted to the frame body 22. Another difference is that the cell frame 2 employs a disrupting structure that disrupts a leak channel 9 (described below with reference to FIG. 2) created by the insertion structure. In the description below, the basic structures of the frame body 22 and the bipolar plate 21 are briefly described and then the insertion structure and the disrupting structure are described in detail.

[Frame Body]

As illustrated in FIG. 1, the frame body 22 is a component that supports the bipolar plate 21 described below. As with the structure of the related art, the frame body 22 includes liquid supplying manifolds 123 and 124, liquid discharging manifolds 125 and 126, inlet slits 123s and 124s, and outlet slits 125s and 126s. The inlet slits 123s and the outlet slit 125s indicated by solid lines are provided on the front side of the plane of the paper of the drawing and the inlet slit 124s and the outlet slit 126s indicated by dotted lines are provided on the rear side of the plane of the paper of the drawing. The slits 123s to 126s respectively extend from the manifolds 123 to 126 toward the center line of the frame body 22 and are connected to the penetrating window 22w (some parts of the inlet slit 124s and the outlet slit 126s are omitted from the drawing). The outer perimeter of the manifolds 123 to 126 and the slits 123s to 126s are surrounded by a seal member 127, such as an O-ring, so that the electrolyte does not leak from inside the seal member 127 to outside. The O-ring functions as a seal when multiple cell frames 2 are stacked and clamped and the O-ring is compressed. The seal member 127 may have a double structure. Although not shown in the drawing, a seal member that surrounds the outer perimeter of the manifolds may be provided.

The material for the frame body 22 preferably has an excellent insulating property and more preferably also has acid resistance. Examples of the material for the frame body 22 include vinyl chloride, chlorinated polyethylene, and chlorinated paraffin.

The thickness of the frame body 22 (the thickness of the portion excluding an inner peripheral recessed portion 22c described below) is preferably 4 mm or more. This is because the manifolds 123 to 126 and the slits 123s to 126s are formed in the frame body 22 and thus the frame body 22 needs to be thick enough to maintain strength.

[Bipolar Plate]

The bipolar plate 21 is a component that has a first surface side that contacts a positive electrode and a second surface side that contacts a negative electrode. The bipolar plate 21 of this example is a plate member that has a substantially even thickness. Among the bipolar plates 21 stacked, the bipolar plates 21 located at ends are in contact with and electrically connected to current collector plates.

Distribution grooves (not illustrated in the drawing) that disperse the electrolytes supplied through the inlet slits 123s and 124s to all parts of the surfaces of the bipolar plate 21 can be formed in the first surface side and the second surface side of the bipolar plate 21 of this example. These distribution grooves particularly effectively function when the positive electrode and the negative electrode disposed on the first surface side and the second surface side of the bipolar plate are thin. The shape of the distribution grooves is not particularly limited. For example, the shape can be a comb-tooth shape or a tree shape.

The material for the bipolar plate 21 preferably has excellent electrical conductivity and preferably also has acid resistance and flexibility. An example is a conductive material containing a carbon material. A specific example is a conductive plastic composed of graphite and a chlorinated organic compound. The conductive plastic may have part of the graphite replaced by at least one selected from carbon black and diamond-like carbon. Examples of the chlorinated organic compound include vinyl chloride, chlorinated polyethylene, and chlorinated paraffin. When the bipolar plate 21 is formed of such a material, the bipolar plate 21 can have low electrical resistance and excellent acid resistance and flexibility.

The thickness of the bipolar plate 21 is not particularly limited but is preferably 2 mm or more. This is because the insertion structure requires the bipolar plate 21 to have a particular level of strength. Since electrodes are placed on both sides of the bipolar plate 21, the thickness of the bipolar plate 21 may be 0.5 mm or more and 2 mm or less smaller than the thickness of the frame body 22.

[Insertion Structure]

The insertion structure is formed by adjusting the dimensions of the insertion structure such that the outer peripheral portion of the bipolar plate 21 filling the penetrating window 22w of the frame body 22 overlaps the frame body 22 throughout the entire perimeter when the cell frame 2 is viewed from front and by recessing a portion of the frame body 22 that overlaps the bipolar plate 21. In this example, the peripheral portion of the frame body 22 that surrounds the entire perimeter of the penetrating window 22w is thinner than other portions of the frame body 22, and this thin portion forms an inner peripheral recessed portion 22c for inserting the bipolar plate 21. The inner peripheral recessed portion 22c in this example is formed only on the first surface side of the frame body 22. In other words, the second surface (rear surface) of the inner peripheral recessed portion 22c is connected flat to the portion on the outer side of the surface (refer to FIG. 3 described below).

Figure 3:
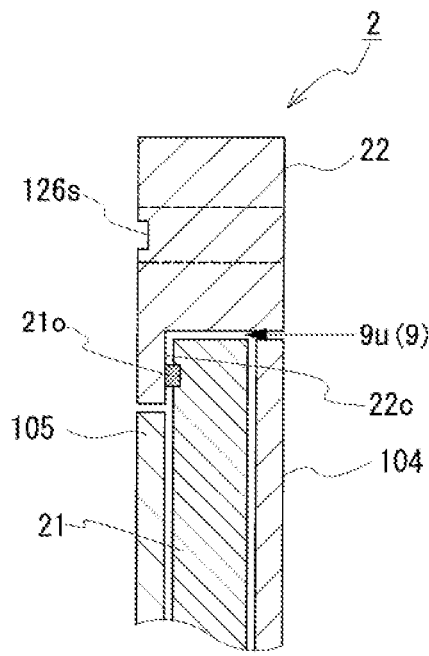
FIG. 3 is a cross-sectional view taken along III-III in FIG. 2.

The state in which the bipolar plate 21 is inserted to the inner peripheral recessed portion 22c will now be described with reference to FIG. 2, which is a schematic view of the cell frame 2, and FIG. 3, which is a cross-sectional view taken along III-III in FIG. 2. As illustrated n FIG. 2, when the bipolar plate 21 is inserted to the inner peripheral recessed portion 22c of the frame body 22, the inner peripheral recessed portion 22c engages with an outer peripheral engaging portion, which is a portion having a particular width and extending throughout the entire outer periphery of the bipolar plate 21, in the thickness direction of the frame body 22 (also refer to FIG. 3). As a result, the penetrating window 22w of the frame body 22 is filled with the bipolar plate 21. As illustrated in FIG. 3, when an insertion structure is employed, there is need to provide a seal between the frame body 22 and the bipolar plate 21 to prevent the electrolytes from distributing between the first surface side and the second surface side of the bipolar plate 21. In this example, a ring-shaped groove is formed in the bipolar plate 21 in a portion that overlaps the inner peripheral recessed portion 22c and an O-ring 21o is placed in the groove so as to form a seal structure. The O-ring 21o is compressed when the stacked cell frames 2 are clamped, and functions as a seal. Alternatively, an adhesive may be applied to the inner peripheral recessed portion 22c so as to bond the inner peripheral recessed portion 22c to the bipolar plate 21 and form a seal structure.

Next, arrangement of the electrodes with respect to the bipolar plate 21 is described with reference to FIG. 3. The shape of a cross section on the lower end side not illustrated in FIG. 3 may be considered to be substantially the same as the upper end side illustrated in the drawing. In FIG. 3, the positive electrode 104 is disposed on the right side of the bipolar plate 21 and the negative electrode 105 is disposed on the left side of the bipolar plate 21. The electrodes 104 and 105 are deformable porous bodies and are compressed between the stacked cell frames 2. The electrodes 104 and 105 have a structure in which positions of their upper ends are different from each other and positions of their lower ends not illustrated in the drawing are also different from each other, in other words, the length of the positive electrode 104 in the vertical direction of the plane of the paper of the drawing is larger than that of the negative electrode 105. This structure is employed so that the electrodes 104 and 105 are disposed in the recessed portion of the frame body 22 without any gap. Although gaps are illustrated between the electrode 104 or 105 and adjacent components in the drawing, no gap is formed in an actual device due to the deformability of the electrodes 104 and 105. The electrodes 104 and 105 are preferably thin. For example, the thickness is preferably 0.5 mm or less. This is because there is a tendency for the internal resistance of the battery cell to increase with the increase in thickness of the electrodes 104 and 105.

When the insertion structure described above is employed, the bipolar plate 21 can be placed in the penetrating window 22w of the frame body 22 by merely inserting the bipolar plate 21 to the inner peripheral recessed portion 22c of the frame body 22, as illustrated in FIG. 2. Moreover, alignment of the bipolar plate 21 with respect to the frame body 22 can be performed by merely inserting the bipolar plate 21 to the inner peripheral recessed portion 22c. Thus, efficiency of producing the cell frame 2 can be improved.

There are issues to be addressed in employing the insertion structure. Namely, it is difficult to adjust the outer dimensions of the inner peripheral recessed portion 22c to be the same as the outer dimensions of the bipolar plate 21 due to the tolerance needed for fabrication. Moreover, even if they are adjusted to be the same, there is a difficulty in inserting the bipolar plate 21 to the frame body 22. To address these issues, the outer dimensions of the inner peripheral recessed portion 22c are made slightly (for example, about 1 mm to 3.0 mm) larger than the outer diameter of the bipolar plate 21 to facilitate insertion of the bipolar plate 21 to the frame body 22. However, in such a case, when the cell frame 2 is viewed from front, a leak channel 9 of electrolyte, which extends from the inlet slit 123s to the outlet slit 125s, is formed between the frame body 22 and the bipolar plate 21. Since the leak channel 9 is a gap between components and has significantly low channel resistance, the electrolyte introduced from the inlet slit 123s to the bipolar plate 21 is likely to flow into the leak channel 9. The electrolyte flowing in the leak channel 9 is discharged to the outlet slit 125s substantially without making contact with the positive electrode disposed on the bipolar plate 21; hence, as more electrolyte flows in the leak channel 9, the charge/discharge efficiency of the battery cell is decreased. Thus, in this embodiment, a disrupting structure that disrupts the leak channel 9 described below is provided.

[Disrupting Structure]

As illustrated in FIG. 2, the leak channel 9 includes a first horizontal direction pathway 9d disposed in a lower portion of the cell frame 2 and connected to the inlet slit 123s, a second horizontal direction pathway 9u disposed in an upper portion of the cell frame 2 and connected to the outlet slit 125s, and two vertical direction pathways 9sr and 9sl that connect the horizontal direction pathways 9d and 9u to each other. There are roughly three structures for the disrupting structure that disrupts the leak channel 9.

(1) A structure in which the leak channel 9 is disrupted by inserting a disrupting member to the leak channel 9

(2) A structure in which a portion of the bipolar plate 21 protrudes toward the frame body 22 so that the protruding portion disrupts the leak channel 9

(3) A structure in which a portion of the frame body 22 protrudes toward the bipolar plate 21 so that the protruding portion disrupts the leak channel 9

Each of the disrupting structures will now be described with reference to FIGS. 4 to 11. In FIGS. 4 to 11, illustration of the manifolds, slits, and other components not directly relevant to the leak channel 9 is omitted. In FIGS. 4 to 11, the portion indicating the bipolar plate 21 is marked by 45° hatching and the leak channel 9 is left blank so as to promote understanding.

[[Structure that Uses a Disrupting Member]]

A structure that uses a disrupting member is described with reference to FIGS. 4 and 5. First, in the structure illustrated in FIG. 4, a block-shaped disrupting member 5 is inserted to a lower portion (portion close to the first horizontal direction pathway 9d) of each of the vertical direction pathways 9sr and 9sl of the leak channel 9 so as to disrupt the leak channel 9. The electrolyte introduced to the first horizontal direction pathway 9d quickly spreads through the first horizontal direction pathway 9d and is evenly dispersed in the width direction (the left-and-right direction on the plane of the paper of the drawing) of the bipolar plate 21. Next, the electrolyte flowing in the vertical direction pathway 9sr (9sl) hits the disrupting member 5 and flows toward the center (electrode side) of the bipolar plate 21. As a result, the electrolyte comes into contact with the electrode disposed on the surface of the bipolar plate 21 and contributes to charging and discharging.

Figure 4:
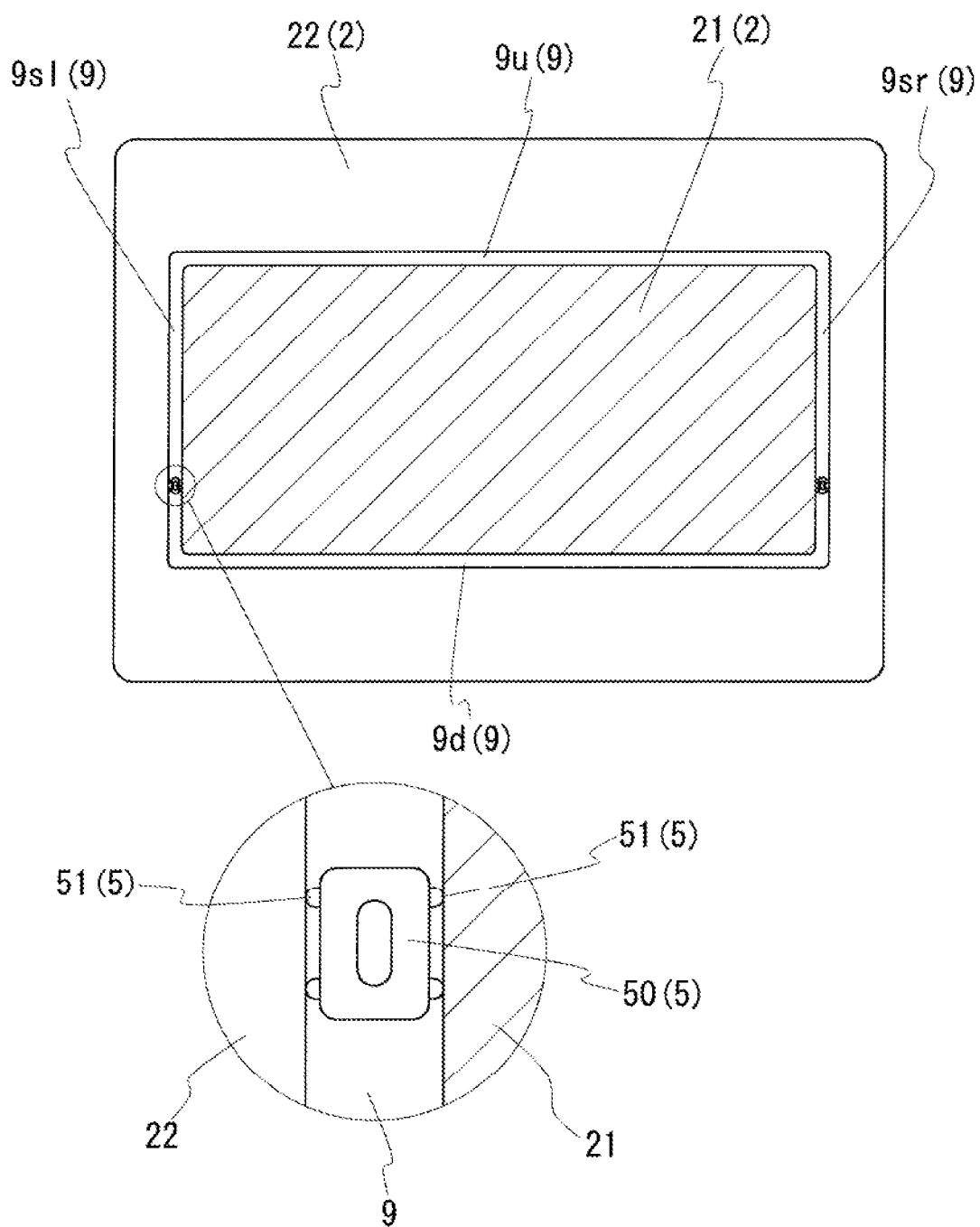
FIG. 4 is a schematic diagram illustrating an example of how a bipolar plate is attached to a frame body.

As illustrated in a circled enlarged diagram in FIG. 4, the disrupting member 5 includes a rectangular main body 50 having a penetrating hole at the center and two protrusions 51 on each of the two side surfaces of the main body 50. The disrupting member 5 is, for example, composed of an elastic material such as a rubber material and can be press-fitted to the leak channel 9. The penetrating hole in the main body 50 has a function of further improving deformability of the disrupting member 5 so that the disrupting member 5 can be easily press-fitted to the leak channel 9 and the disrupting member 5 can make close contact with the frame body 22 and the bipolar plate 21 when press-fitted. Moreover, since the protrusions 51 are formed on the side surfaces of the main body 50, pressure resulting from deformation of the main body 50 concentrates on the protrusions 51, the protrusions 51 are firmly pressed against the frame body 22 and the bipolar plate 21, and thus the leak channel 9 can be assuredly disrupted.

Figure 5:
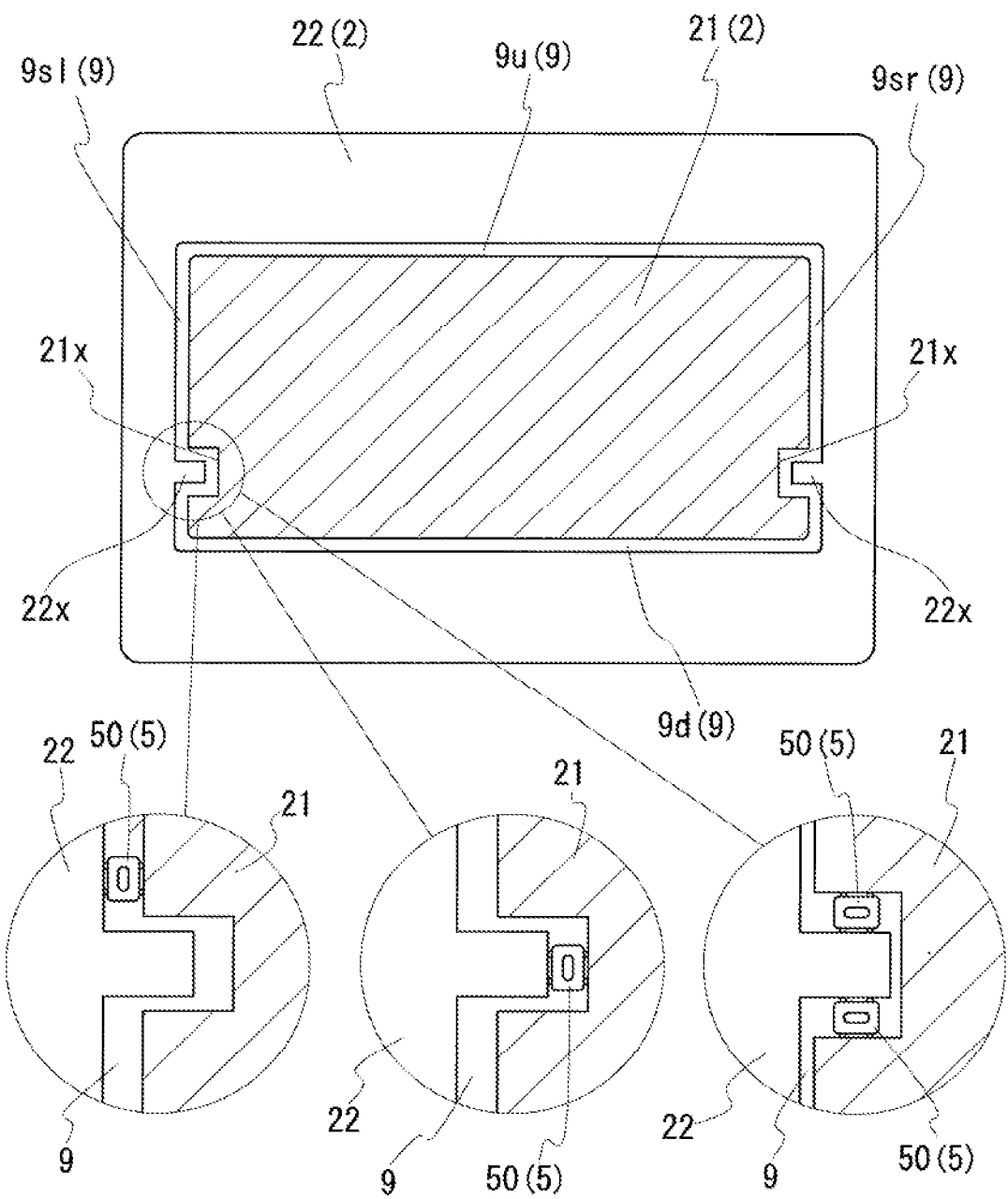
FIG. 5 is a schematic diagram illustrating an example of how a bipolar plate is attached to a frame body.

In the embodiment shown in FIG. 5, a portion of the vertical direction pathway 9sr (9sl) of the leak channel 9 is meandered and a disrupting member 5 is placed near the meandering portion (the portion circled by a thin line). The form of the disrupting member 5 is the same as that used in FIG. 4.

In order to form a meandering leak channel 9, first protruding portions 22x are formed by protruding portions of the frame body 22 equivalent to the edge of the inner peripheral recessed portion toward the inner peripheral recessed portion and first recessed portions 21x are formed by cutting out portions of the bipolar plate 21 corresponding to the first protruding portions 22x. In this manner, when the bipolar plate 21 is inserted to the frame body 22, the leak channel 9 can be made to meander at portions where the first protruding portions 22x mesh with the first recessed portions 21x. By forming a meandering leak channel 9, the channel resistance of the meandering portions can be increased. Moreover, by placing a disrupting member 5 at a position where the channel resistance is high, the leak channel 9 can be more assuredly disrupted than in the embodiment illustrated in FIG. 4. The number of meandering portions can be increased from the number of the meandering portions illustrated in FIG. 5.

Examples of the position where the disrupting member 5 is placed are positions illustrated in three circled enlarged diagrams in FIG. 5 (the disrupting members 5 are also placed in the meandering portion on the right side). First, the circled enlarged diagram on the left side illustrates a structure in which a disrupting member 5 is inserted to a portion that extends in the vertical direction and above the meandering portion. In this case, the electrolyte whose flow has been weakened by passing through the meandering portion is blocked by the disrupting member 5; thus, the flow of the electrolyte in the leak channel 9 can be effectively reduced.

Next, the circled enlarged diagram at the center illustrates a structure in which a disrupting member 5 is inserted to a portion in the meandering portion and extending in the vertical direction. In this case also, the electrolyte whose flow has just been weakened at the meandering portion is blocked by the disrupting member 5; thus, the flow of the electrolyte in the leak channel 9 can be effectively reduced.

Lastly, the circled enlarged diagram on the right side illustrates a structure in which disrupting members 5 are respectively inserted to two horizontally-extending portions of the meandering portion. Since the disrupting members 5 and 5 are inserted at two places, the leak channel 9 can be more assuredly disrupted. Moreover, since the cell frame 2 usually has a landscape orientation, the tolerance and the amount of thermal expansion of the frame body 22 in the vertical direction with respect to the plane of the paper of the drawing are smaller than the tolerance and the amount of thermal expansion in the horizontal direction of the plane of the paper of the drawing. Thus, the leak channel 9 can be more assuredly disrupted by employing a structure in which the disrupting member 5 is inserted in a direction in which the tolerance and the amount of thermal expansion of the frame body 22 are small (in other words, a structure in which a disrupting member 5 is inserted to a position where the outer rim of the bipolar plate 21 and the outer rim of the inner peripheral recessed portion oppose each other in a vertical direction in the meandering portion).

Figure 6:
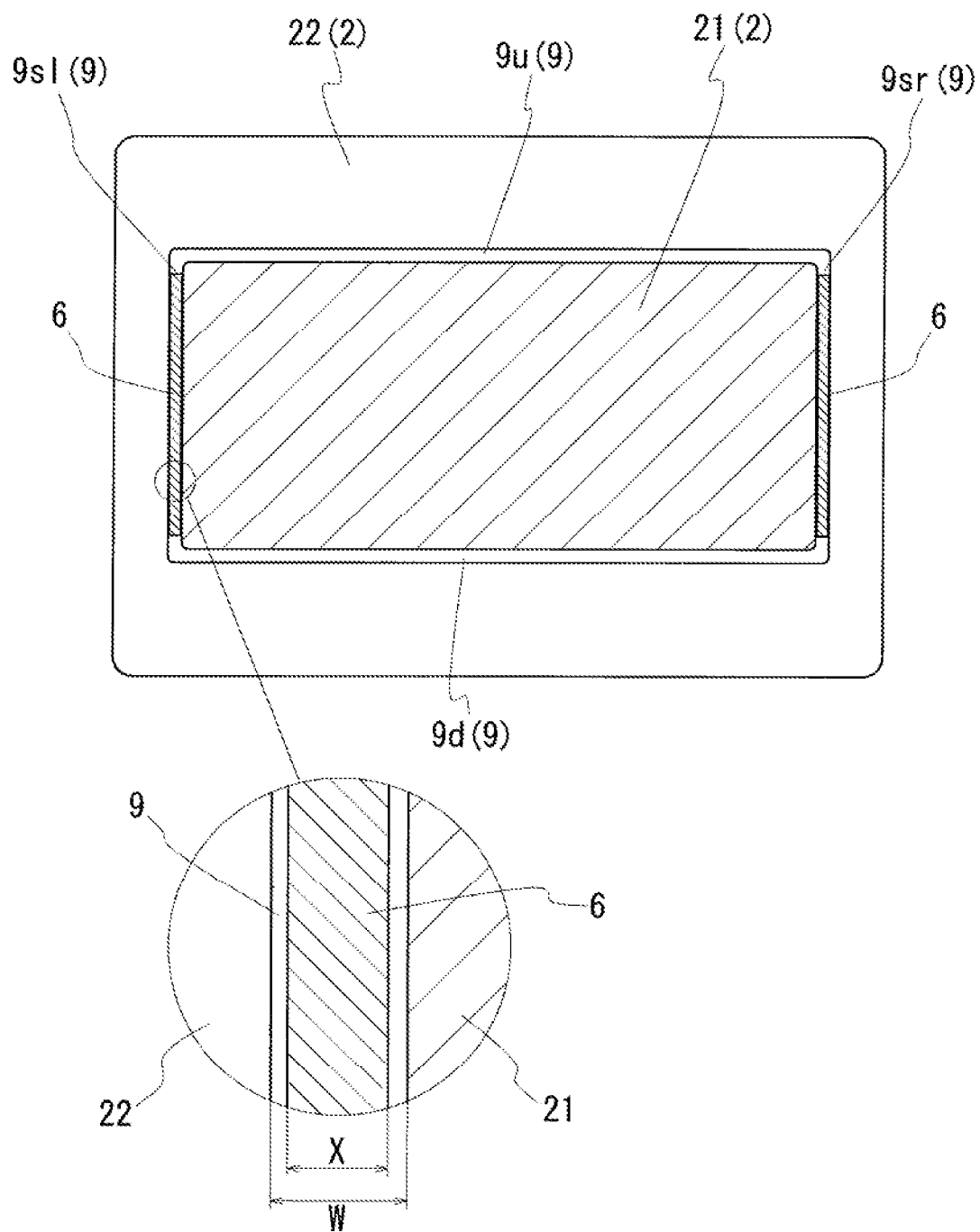
FIG. 6 is a schematic diagram illustrating an example of how a bipolar plate is attached to a frame body.

The shape of the disrupting member is not necessarily limited to the shape illustrated in FIGS. 4 and 5. When the size of the cell frame 2 illustrated in FIG. 2 increases, the width of the leak channel 9 formed between the frame body 22 and the bipolar plate 21 also tends to increase. In such a case, a long disrupting member 6 illustrated in FIG. 6 is preferable since it is easily inserted to the leak channel 9. The position where the long disrupting member 6 is inserted may be in the vertical direction pathway 9sl (9sr), as illustrated in the drawing. All parts of the vertical direction pathway 9sl (9sr) may be filled with the disrupting member 6 or only part of the vertical direction pathway 9sl (9sr) may be filled with the disrupting member 6.

Even for a large-size cell frame 2, the width W (refer to the circled enlarged diagram) of the leak channel 9 is preferably not excessively large. In view of ease of inserting the disrupting member 6 to the leak channel 9, the width W is preferably 3 mm or more and 20 mm or less and more preferably 3 mm or more and 7 mm or less. The difference (width W− width X) between the width W of the leak channel 9 and the width X of the disrupting member 6 inserted to the leak channel 9 is preferably 1 mm or less. Even when this slight difference exists, the electrolyte rarely flows into the leak channel 9 since the long disrupting member 6 is disposed along the direction in which the leak channel 9 (in this case, the vertical direction pathways 9sl and 9sr) extends. Naturally, in view of the purpose of installing the disrupting member 6, the difference is preferably 0 mm (gap-free). In order for the difference to be 0 mm, the width of the disrupting member 6 before insertion to the leak channel 9 is to be larger than the width W of the leak channel 9. In other words, the difference can be 0 mm if a structure in which the disrupting member 6 is press-fitted into the leak channel 9 is employed. When a structure in which the disrupting member 6 is press-fitted into the leak channel 9 is employed and the width of the disrupting member 6 before press-fitting is excessively larger than then width W of the leak channel 9, excessive stress would act on the bipolar plate 21 and the like. Thus, the width W of the leak channel 9 is preferably adjusted to be 60% or more of the width of the disrupting member 6 before press-fitting.

The properties desirable for the long disrupting member 6 are an appropriate level of flexibility and electrolyte impermeability. Other properties desirable for the disrupting member 6 are that the disrupting member 6 gives little eluted substances in the electrolyte when it comes into contact with the electrolyte and has acid resistance. The reference value of the flexibility of the disrupting member 6 is, for example, 30 kPa or more and 150 kPa or less in terms of compression strain in accordance with JIS K 6400.

Examples of the material for the disrupting member 6 that satisfies at least one of the above-described properties include rubber, sponge rubber, polyethylene foam, urethane foam, and polystyrene foam. Non-woven cloth, carbon non-woven cloth, carbon cloth, carbon paper, rayon felt, and the like may also be used to form the disrupting member 6.

Figure 7:
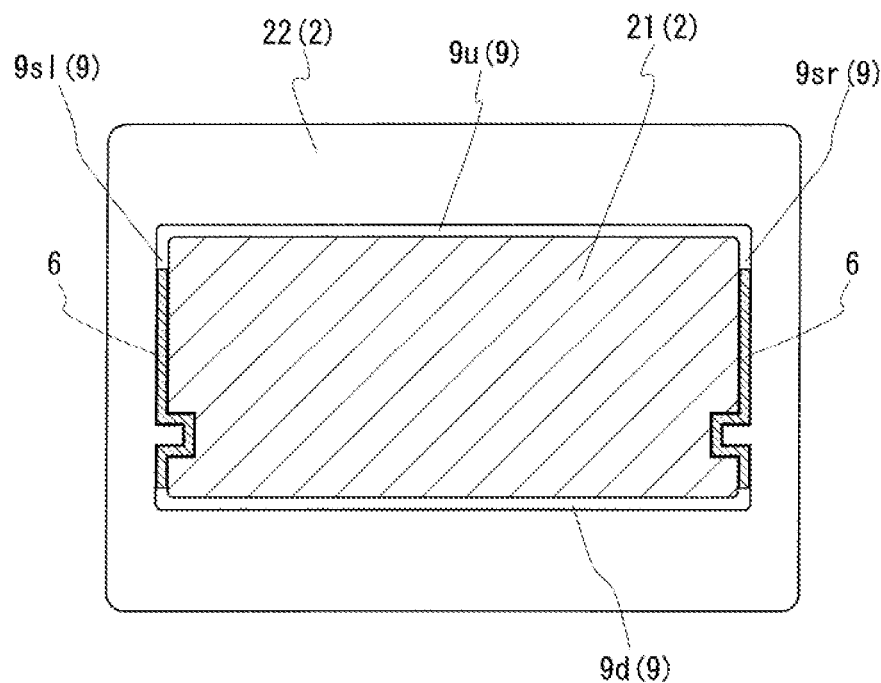
FIG. 7 is a schematic diagram illustrating an example of how a bipolar plate is attached to a frame body.

Alternatively, as illustrated in FIG. 7, long disrupting members 6 may be inserted to a meandering leak channel 9. When the width of the leak channel 9 is large enough, long disrupting members 6 can be easily inserted to the meandering leak channel 9 as long as the disrupting members 6 are highly flexible.

[[Structure in which a Portion of a Frame Body Protrudes Toward a Bipolar Plate]]

A structure in which a portion of a frame body protrudes toward a bipolar plate will now be described with reference to FIGS. 8 and 9. First, in the embodiment illustrated in FIG. 8, a portion of the frame body 22 corresponding to a side surface of the bipolar plate 21 curves and protrudes toward the bipolar plate 21. The side surface of the bipolar plate 21 is straight. Thus, the bipolar plate 21 are sandwiched between the protruding portions on the both sides and the protruding portion disrupts the vertical direction pathway 9sr (9sl) of the leak channel 9. In this case, the bipolar plate 21 is press-fitted to the protruding portions; however, in portions other than the protruding portions, there are gaps between the frame body 22 and the bipolar plate 21. Thus, the problem of a difficulty of inserting the bipolar plate 21 to the frame body 22 rarely arises.

Figure 9:
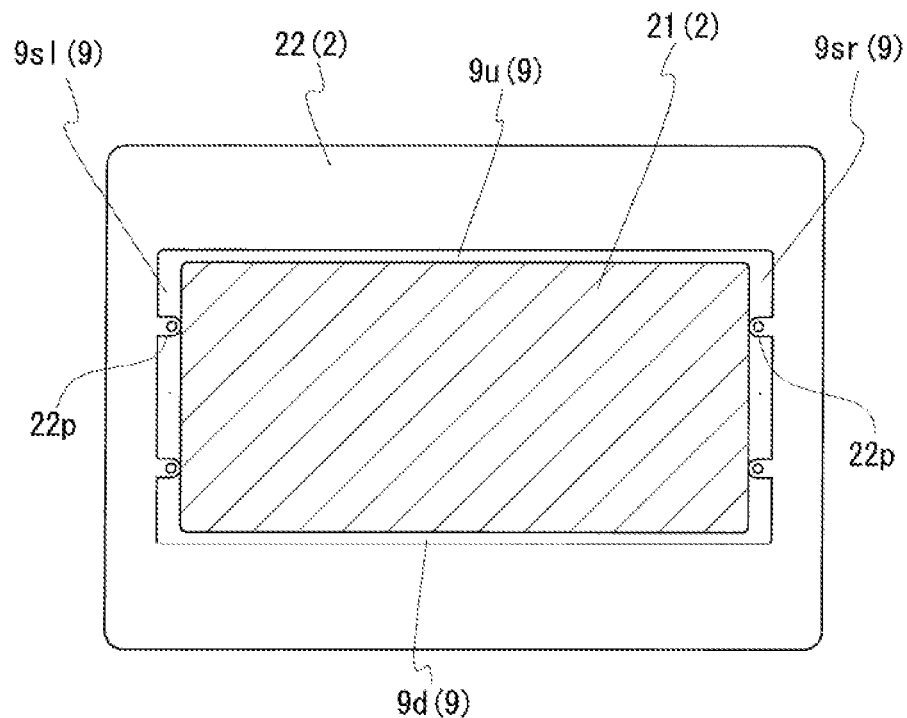
FIG. 9 is a schematic diagram illustrating an example of how a bipolar plate is attached to a frame body.

Next, in the embodiment illustrated in FIG. 9, protruding pieces 22p that protrude toward the bipolar plate 21 are formed at portions that correspond to the side surfaces of the bipolar plate 21. The protruding pieces 22p have holes and thus are easily deformable. According to this structure, the bipolar plate 21 are sandwiched between the protruding pieces 22p on the both sides and thus the protruding pieces 22p disrupt the vertical direction pathway 9sr (9sl) of the leak channel 9. In this case also, the bipolar plate 21 is press-fitted into the portions of the frame body 22 where the protruding pieces 22p are provided; however, in portions other than the protruding pieces 22p, there are gaps between the frame body 22 and the bipolar plate 21. Thus, the problem of a difficulty of inserting the bipolar plate 21 to the frame body 22 rarely arises. The number of protruding pieces 22p is not limited to one illustrated in the drawing and may be larger or smaller than that illustrated in the drawing.

[[Structure in which a Portion of a Bipolar Plate Protrudes Toward a Frame Body]]

A structure in which a portion of a bipolar plate protrudes toward a frame body will now be described with reference to FIGS. 10 and 11. First, in the embodiment illustrated in FIG. 10, side surface portions of the bipolar plate 21 curve and protrude toward the frame body 22. Portions of the frame body 22 that correspond to the side surfaces of the bipolar plate 21 are straight. Thus, the protruding portions are sandwiched between two sides of the frame body 22 and the protruding portions disrupt the vertical direction pathway 9sr (9sl) of the leak channel 9. In this case, the protruding portions of the bipolar plate 21 are pushed into the frame body 22; however, in the portions other than the protruding portions, there are gaps between the frame body 22 and the bipolar plate 21. Thus, the problem of a difficulty of inserting the bipolar plate 21 to the frame body 22 rarely arises.

Figure 11:
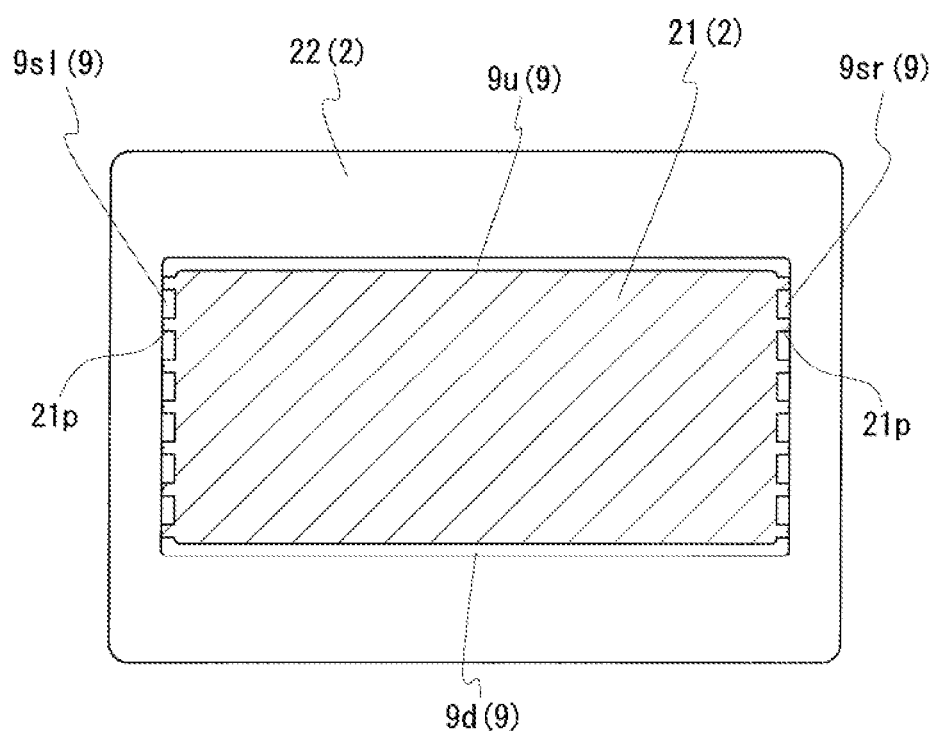
FIG. 11 is a schematic diagram illustrating an example of how a bipolar plate is attached to a frame body.

Next, in the embodiment illustrated in FIG. 11, multiple protruding pieces 21p that protrude toward the frame body 22 are formed on side surface portions of the bipolar plate 21. According to this structure, the protruding pieces 21p of the bipolar plate 21 are sandwiched between two sides of the frame body 22 and the protruding pieces 21p disrupt the vertical direction pathway 9sr (9sl) of the leak channel 9. In this case also, the protruding pieces 21p of the bipolar plate 21 are pushed into the frame body 22; however, in the portions other than the protruding pieces 21p, there are gaps between the frame body 22 and the bipolar plate 21. Thus, the problem of a difficulty of inserting the bipolar plate 21 to the frame body 22 rarely arises. The number of protruding pieces 21p is not limited to that illustrated in the drawing and may be larger or smaller than that illustrated in the drawing.

The leak channel 9 can be disrupted by employing any of the disrupting structures described above and the amount of electrolyte flowing in the leak channel 9 can be significantly reduced. As a result, degradation of the charge/discharge efficiency of the battery cell caused by the leak channel 9 can be suppressed.

Embodiment 2

In Embodiment 2, an example in which a bipolar plate 31 has a portion that has a particular width and engages with an inner peripheral recessed portion 32c of a frame body 32 and this portion is made thinner than other portions of the bipolar plate 31 is described with reference to FIGS. 12 to 14.

Figure 12:
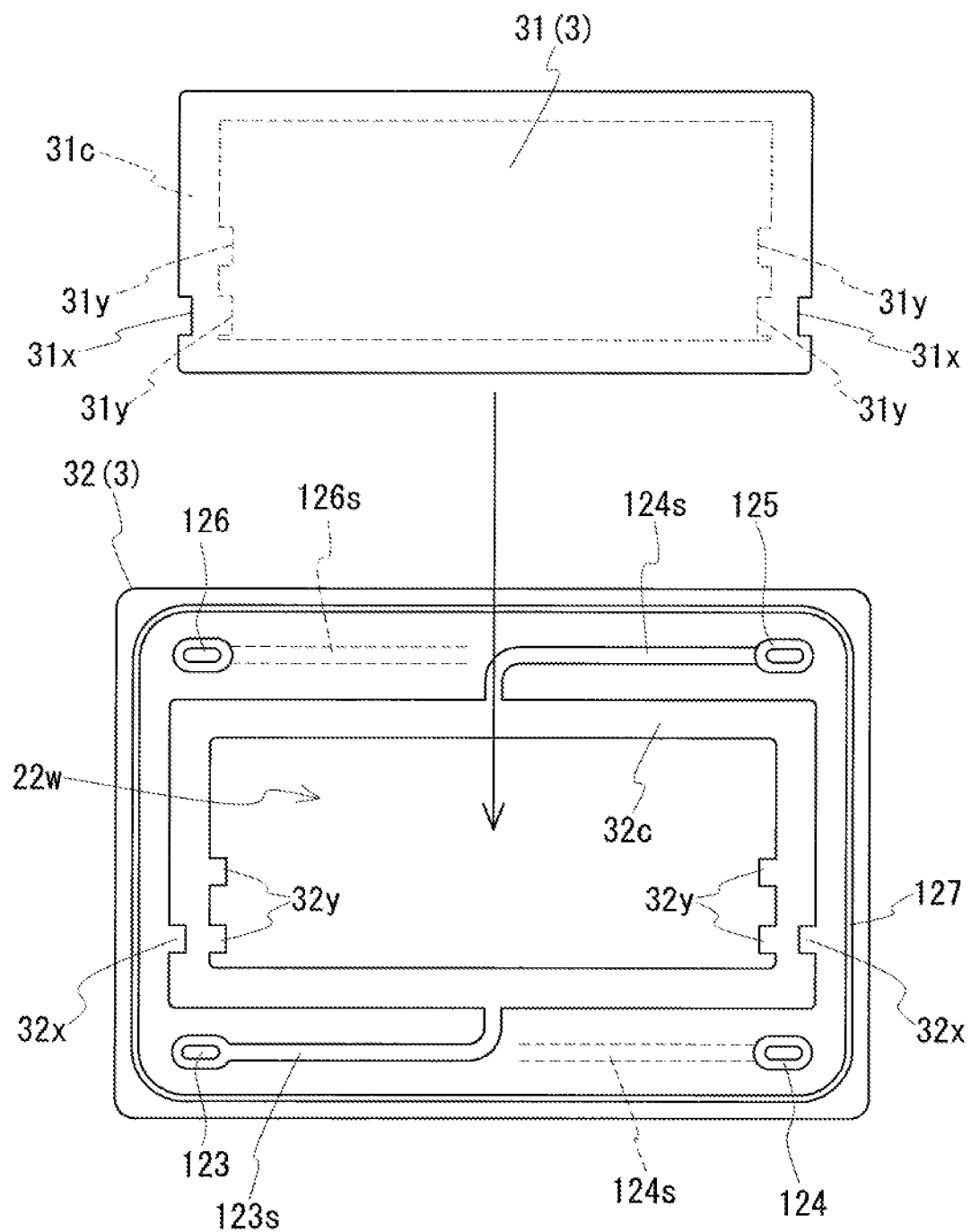
FIG. 12 is a schematic diagram illustrating a frame body and a bipolar plate of a cell frame included in a battery cell according to Embodiment 2.

FIG. 12 is a schematic diagram of a frame body 32 and a bipolar plate 31 included in a cell frame 3 according to Embodiment 2. The frame body 32 and the bipolar plate 31 are configured to form a meandering leak channel 9 described with reference to FIG. 5. In order to form a meandering leak channel 9, the frame body 32 of this embodiment includes first protruding portions 32x protruding toward the inner peripheral recessed portion 32c. The frame body 32 also includes second protruding portions 32y protruding from the inner peripheral recessed portion 32c toward a penetrating window 22w.

The bipolar plate 31 of this embodiment includes first recessed portions 31x to form a meandering leak channel 9. The first recessed portions 31x are formed by cutting out portions of the frame body 32 that correspond to the first protruding portions 32x. An outer peripheral engaging portion (portion outside the portion indicated by the dotted lines) that is a portion of the rear surface side of the bipolar plate 31 and engages with the inner peripheral recessed portion 32c of the frame body 32 is formed to have a smaller thickness than other portions of the bipolar plate 31 and constitutes a thin portion 31c. A surface of the thin portion 31c on the front side of the plane of the paper of the drawing is flush with other portions and thus a surface of the thin portion 31c on the rear side of the plane of the paper of the drawing is set back toward the front side of the plane of the paper of the drawing compared to other portions. In the thin portion 31c, portions corresponding to the second protruding portions 32y of the frame body 32 include second recessed portions 31y formed by being extended toward the center line of the bipolar plate 31.

Figure 13:
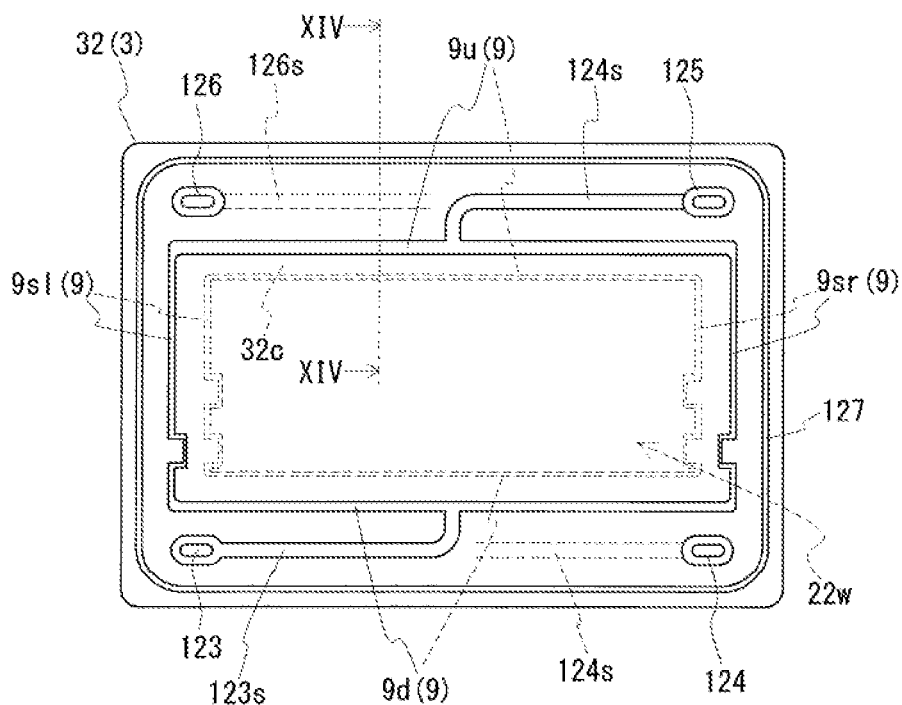
FIG. 13 is a schematic diagram illustrating a cell frame in which the frame body and the bipolar plate illustrated in FIG. 12 are combined.
Figure 14:
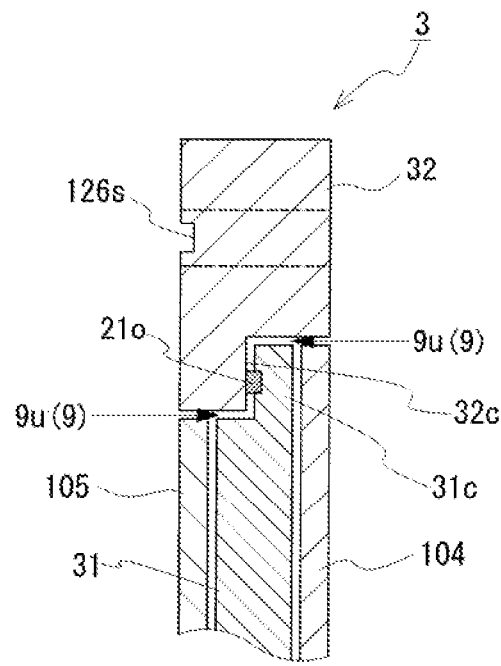
FIG. 14 is a cross-sectional view taken along XIV-XIV in FIG. 13.

When the bipolar plate 31 having the above-described structure is inserted to the frame body 32, as illustrated in FIGS. 13 and 14, not only a leak channel 9 is formed on a first surface side (the front side of the plane of the paper of the drawing in FIG. 13 and the right side on the plane of the paper of the drawing in FIG. 14) of the cell frame 3 but also a leak channel 9 is formed on the second surface side (the rear side of the plane of the paper of the drawing in FIG. 13 and the left side on the plane of the paper of the drawing in FIG. 14). The two leak channels 9 are disrupted by the disrupting members 5 near the meandering portions as illustrated in the circled enlarged diagrams in FIG. 5. Alternatively, the two leak channels 9 may be disrupted by the disrupting members 6 illustrated in FIG. 7.

According to the structure of Embodiment 2 described above, as illustrated in FIG. 14, the portions of the bipolar plate 31 other than the thin portion 31c fit into the penetrating window of the frame body 32 and the state of engagement of the bipolar plate 31 with respect to the frame body 32 is more stable than in Embodiment 1.

Other Embodiments

Figure 8:
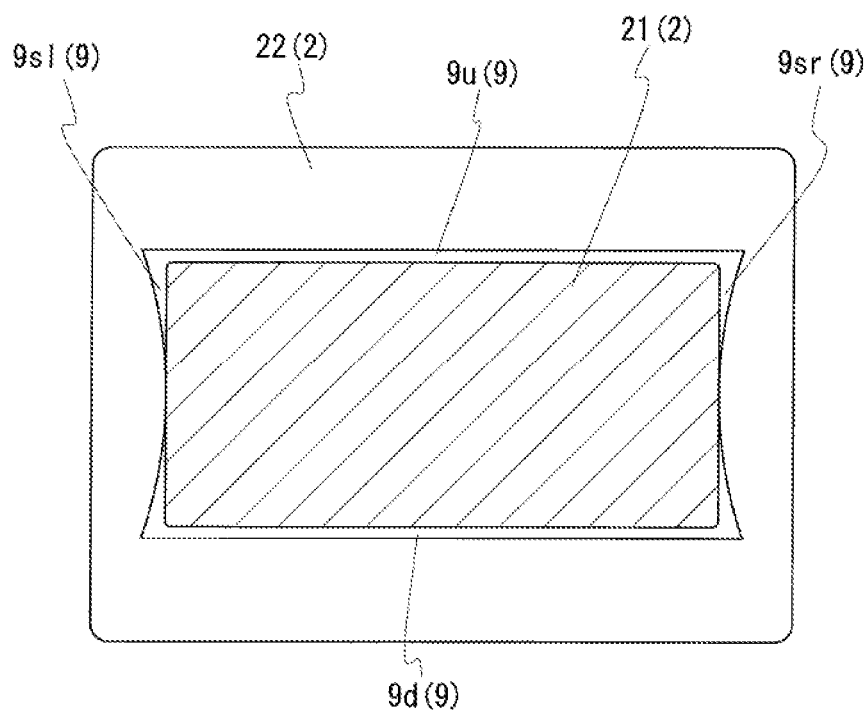
FIG. 8 is a schematic diagram illustrating an example of how a bipolar plate is attached to a frame body.
Figure 10:
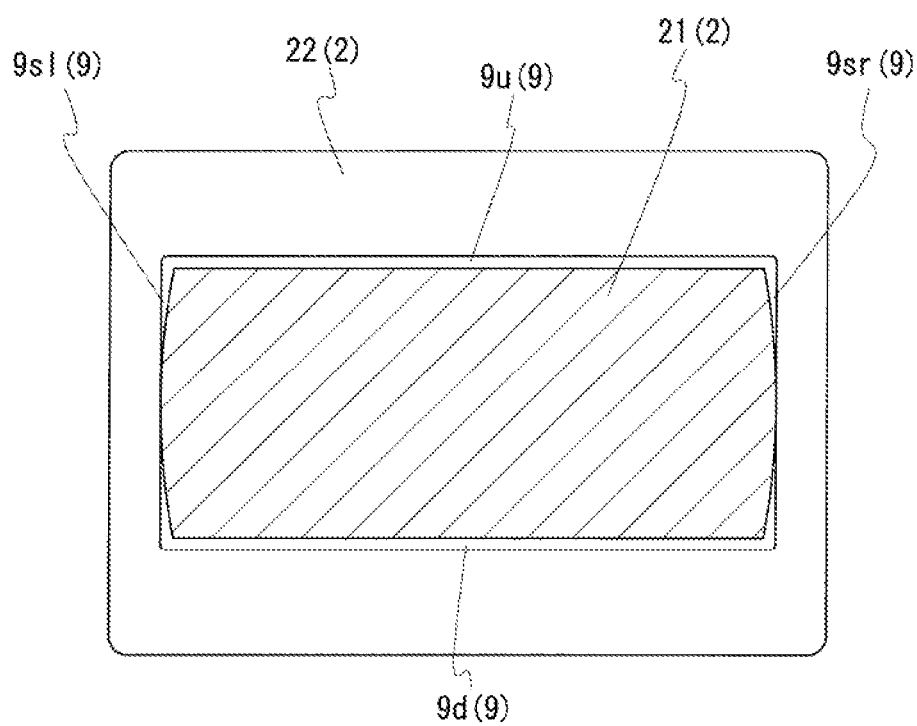
FIG. 10 is a schematic diagram illustrating an example of how a bipolar plate is attached to a frame body.

The embodiment of forming a thin portion 31c in the bipolar plate 31 as described in Embodiment 2 may employ a structure in which a leak channel 9 is disrupted by making a frame body protrude toward a bipolar plate as illustrated in FIGS. 8 and 9 or a structure in which a leak channel 9 is disrupted by making a bipolar plate protrude toward a frame body as illustrated in FIGS. 10 and 11.

INDUSTRIAL APPLICABILITY

A battery cell according to the present invention is applicable to constructing fluid-flow-type storage batteries such as RF batteries. The RF battery according to the present invention can be used as a storage battery aimed at stabilizing fluctuations of power generation output, storing excess power at the time of excess power generation, and achieving load leveling for power generation of new energy such as solar power and wind power. Moreover, the RF battery can also be used as a high-capacity storage battery used together with a typical power plant so as to overcome instantaneous voltage drop and electric outage and achieve load leveling.

REFERENCE SIGNS LIST 1 redox flow battery (RF battery)
2,3 cell frame
21, 31 bipolar plate
31c thin portion, 21o O-ring, 21p protruding piece
21x, 31x first recessed portion, 31y second recessed portion
22, 32 frame body
22c, 32c inner peripheral recessed portion, 22p protruding piece, 22w penetrating window
22x, 32x first protruding portion, 32y second protruding portion
5, 6 disrupting member, 50 main body, 51 protrusion
9 leak channel
9d first horizontal direction pathway, 9u second horizontal direction pathway
9sr, 9sl vertical direction pathway
100 cell, 101 membrane, 102 positive electrode cell, 103 negative electrode cell
100P positive electrode circulation mechanism, 100N negative electrode circulation mechanism
104 positive electrode, 105 negative electrode, 106 positive electrode electrolyte tank
107 negative electrode electrolyte tank, 108,109,110, 111 ducts
112, 113 pump
120 cell frame, 121 bipolar plate, 122 frame body
123, 124 liquid supplying manifold
125, 126 liquid discharging manifold
123s, 124s inlet slit, 125s, 126s outlet slit
127 seal member
190 supply/discharge plate, 210, 220 end plate
200 battery cell stack, 200s substack
230 clamping mechanism

The invention claimed is:
1. A battery cell comprising:
a cell unit in which a membrane is sandwiched between a positive electrode and a negative electrode and the electrodes are sandwiched between a pair of cell frames,
the cell frames each including a frame body that has a penetrating window and a bipolar plate that contacts the electrode by filling the penetrating window,
the frame body including a liquid supplying manifold that penetrates through the frame body in a thickness direction thereof to serve as a supply channel of an electrolyte, a liquid discharging manifold that serves as a discharge channel of the electrolyte, an inlet slit through which the electrolyte is introduced from the liquid supplying manifold to the electrode, and an outlet slit through which the electrolyte is discharged from the electrode to the liquid discharging manifold,
wherein the frame body includes an inner peripheral recessed portion formed by reducing a thickness of a peripheral portion that surrounds an entire perimeter of the penetrating window so that the peripheral portion has a smaller thickness than other portions of the frame body,
the bipolar plate includes an outer peripheral engaging portion that engages with the inner peripheral recessed portion, the outer peripheral engaging portion being a portion having a particular width and extending throughout an entire outer periphery of the bipolar plate,
the battery cell includes a disrupting structure that disrupts a leak channel that serves as an escape route for the electrolyte, the leak channel causing the inlet slit and the outlet slit to be in communication with each other and being formed between an outer periphery of the inner peripheral recessed portion and an outer periphery of the outer peripheral engaging portion when the cell frames are viewed from front, and
the battery cell comprises a disrupting member that is inserted to the leak channel to disrupt the leak channel, the disrupting member is composed of an elastic material.

2. The battery cell according to claim 1, wherein the outer peripheral engaging portion is formed to have a smaller thickness than other portions of the bipolar plate.

3. The battery cell according to claim 1, wherein, when the cell frames are viewed in plan, a portion of an outer rim portion of the bipolar plate protrudes toward the frame body and this protruding portion disrupts the leak channel.

4. The battery cell according to claim 1, wherein, when the cell frames are viewed in plan, a portion of the frame body protrudes toward the bipolar plate and this protruding portion disrupts the leak channel.

5. The battery cell according to claim 1, wherein the compression strain of the elastic material in accordance with JIS K 6400 is 30 kPa or more and 150 kPa or less.

6. A redox flow battery comprising:
a cell stack obtained by stacking a plurality of the battery cells according to claim 1;
a positive electrode circulation mechanism that causes a positive electrode electrolyte to circulate through the cell stack; and
a negative electrode circulation mechanism that causes a negative electrode electrolyte to circulate through the cell stack.

7. A battery cell comprising:
a cell unit in which a membrane is sandwiched between a positive electrode and a negative electrode and the electrodes are sandwiched between a pair of cell frames,
the cell frames each including a frame body that has a penetrating window and a bipolar plate that contacts the electrode by filling the penetrating window,
the frame body including a liquid supplying manifold that penetrates through the frame body in a thickness direction thereof to serve as a supply channel of an electrolyte, a liquid discharging manifold that serves as a discharge channel of the electrolyte, an inlet slit through which the electrolyte is introduced from the liquid supplying manifold to the electrode, and an outlet slit through which the electrolyte is discharged from the electrode to the liquid discharging manifold,
wherein the frame body includes an inner peripheral recessed portion formed by reducing a thickness of a peripheral portion that surrounds an entire perimeter of the penetrating window so that the peripheral portion has a smaller thickness than other portions of the frame body, the bipolar plate includes an outer peripheral engaging portion that engages with the inner peripheral recessed portion, the outer peripheral engaging portion being a portion having a particular width and extending throughout an entire outer periphery of the bipolar plate, and the battery cell includes a disrupting structure that disrupts a leak channel that serves as an escape route for the electrolyte, the leak channel causing the inlet slit and the outlet slit to be in communication with each other and being formed between an outer periphery of the inner peripheral recessed portion and an outer periphery of the outer peripheral engaging portion when the cell frames are viewed from front, wherein, when the cell frames are viewed in plan, a portion of an outer rim portion of the bipolar plate protrudes toward the frame body and this protruding portion disrupts the leak channel.

* * * * *